United States Patent
Tobayashi et al.

(10) Patent No.: US 11,728,742 B2
(45) Date of Patent: Aug. 15, 2023

(54) POWER CONVERSION APPARATUS THAT DRIVES A MOTOR BY RECEIVING A THREE-PHASE AC VOLTAGE FROM AN AC POWER SYSTEM

(71) Applicant: Toshiba Mitsubishi-Electric Industrial Systems Corporation, Tokyo (JP)

(72) Inventors: Shunsuke Tobayashi, Tokyo (JP); Hiromitsu Suzuki, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 273 days.

(21) Appl. No.: 17/243,797

(22) Filed: Apr. 29, 2021

(65) Prior Publication Data
US 2021/0249966 A1 Aug. 12, 2021

Related U.S. Application Data

(63) Continuation of application No. PCT/JP2018/042090, filed on Nov. 14, 2018.

(51) Int. Cl.
*H02M 5/458* (2006.01)
*H02M 7/483* (2007.01)
(Continued)

(52) U.S. Cl.
CPC ......... *H02M 5/4585* (2013.01); *H02M 7/483* (2013.01); *H02M 7/487* (2013.01);
(Continued)

(58) Field of Classification Search
CPC .. H02M 5/4585; H02M 7/483; H02M 7/4833; H02M 7/487; H02P 27/08; H02P 27/14; H02P 2201/01
See application file for complete search history.

(56) References Cited

U.S. PATENT DOCUMENTS 5,212,438 A * 5/1993 Miyazaki ............... H02P 21/00
318/807
6,366,483 B1 * 4/2002 Ma ..................... H02M 1/4216
363/41
(Continued)

FOREIGN PATENT DOCUMENTS

| JP | 2013-143836 A | 7/2013 |
| JP | 2018-148709 A | 9/2018 |
| WO | WO 2012/039034 A1 | 3/2012 |

OTHER PUBLICATIONS

Office Action dated Feb. 23, 2022 in corresponding Indian Patent Application No. 202117021551 (with English Translation), 2 pages.
(Continued)

*Primary Examiner* — Yusef A Ahmed
(74) *Attorney, Agent, or Firm* — Oblon, McClelland, Maier & Neustadt, L.L.P.

(57) ABSTRACT

A power conversion apparatus capable of supplying a required reactive power while dynamically changing a dead band near 0 reactive current and maintaining a balance of DC voltage is provided. The power conversion apparatus including a three-level converter, a PWM controller for the three-level converter, an input current detector of the three-level converter, a coordinate converter that converts the current into a d-axis and q-axis current feedback, the reactive power control unit that controls a reactive power and outputs an reactive current reference, a d-axis current control unit having a dead band part for setting the d-axis current reference with hysteresis characteristics in the q-axis current feedback, and outputs the d-axis voltage reference, a q-axis current control unit that outputs a q-axis voltage reference based on the q-axis current reference, an inverse coordinate converter that outputs a three-phase AC voltage command based on the d-axis and q-axis voltage reference.

9 Claims, 2 Drawing Sheets

(51) Int. Cl.
*H02M 7/487* (2007.01)
*H02P 27/08* (2006.01)
*H02P 27/14* (2006.01)

(52) U.S. Cl.
CPC .......... *H02M 7/4833* (2021.05); *H02P 27/08* (2013.01); *H02P 27/14* (2013.01); *H02P 2201/01* (2013.01)

(56) References Cited

U.S. PATENT DOCUMENTS

| | | | | |
|---|---|---|---|---|
| 9,270,194 B2* | 2/2016 | Brogan | | H02M 5/4585 |
| 11,228,258 B2* | 1/2022 | Hayashi | | H02M 3/158 |
| 11,231,014 B2* | 1/2022 | Larsen | | F03D 9/257 |
| 11,411,427 B2* | 8/2022 | Hayashi | | H02M 5/4585 |
| 11,424,693 B2* | 8/2022 | Hayashi | | H02M 7/4837 |
| 2003/0020431 A1* | 1/2003 | Kiuchi | | H02P 21/06 |
| | | | | 318/779 |
| 2004/0008530 A1* | 1/2004 | Kitahata | | H02M 7/5387 |
| | | | | 363/131 |
| 2005/0073280 A1* | 4/2005 | Yoshinaga | | H02P 21/00 |
| | | | | 318/727 |
| 2007/0121354 A1* | 5/2007 | Jones | | H02J 3/381 |
| | | | | 363/67 |
| 2010/0128502 A1* | 5/2010 | Kawamoto | | H02P 21/09 |
| | | | | 363/34 |
| 2011/0127837 A1* | 6/2011 | Sato | | H02J 9/062 |
| | | | | 307/66 |
| 2011/0134672 A1* | 6/2011 | Sato | | H02M 1/10 |
| | | | | 363/126 |
| 2011/0170322 A1* | 7/2011 | Sato | | H02M 7/487 |
| | | | | 363/40 |
| 2011/0194318 A1* | 8/2011 | Kono | | H02M 7/53875 |
| | | | | 363/37 |
| 2012/0001581 A1* | 1/2012 | Sumita | | H02P 21/0003 |
| | | | | 318/490 |
| 2013/0207622 A1* | 8/2013 | Yuan | | G05F 1/70 |
| | | | | 323/207 |
| 2013/0215652 A1* | 8/2013 | Komatsu | | H02M 5/458 |
| | | | | 363/37 |
| 2013/0279213 A1* | 10/2013 | Saeki | | H02M 5/4585 |
| | | | | 363/125 |
| 2013/0279214 A1* | 10/2013 | Takase | | H02M 7/68 |
| | | | | 363/37 |
| 2013/0300334 A1* | 11/2013 | Tooyama | | H02P 29/50 |
| | | | | 318/504 |
| 2014/0117893 A1* | 5/2014 | Omata | | H02P 21/20 |
| | | | | 318/400.02 |
| 2014/0225539 A1* | 8/2014 | Omata | | H02P 29/0243 |
| | | | | 318/400.02 |
| 2014/0362623 A1* | 12/2014 | Farkas | | H02M 1/12 |
| | | | | 363/97 |
| 2015/0002066 A1* | 1/2015 | Oda | | H02M 7/487 |
| | | | | 318/500 |
| 2015/0236615 A1* | 8/2015 | Xue | | H02M 7/53875 |
| | | | | 363/97 |
| 2015/0280612 A1* | 10/2015 | Ide | | H02M 7/53871 |
| | | | | 363/98 |
| 2015/0323232 A1* | 11/2015 | Kawashima | | F25B 43/003 |
| | | | | 363/48 |
| 2016/0126871 A1* | 5/2016 | Uematsu | | H02P 21/10 |
| | | | | 318/400.02 |
| 2016/0226425 A1* | 8/2016 | Kawashima | | H02M 5/45 |
| 2017/0294864 A1* | 10/2017 | Tada | | H02P 25/22 |
| 2018/0123498 A1* | 5/2018 | Tanabe | | H02M 1/32 |
| 2018/0287544 A1* | 10/2018 | Kato | | H02M 1/38 |
| 2019/0089300 A1* | 3/2019 | Matsuoka | | H02M 7/48 |
| 2019/0181677 A1* | 6/2019 | Toyoda | | H02J 9/06 |
| 2020/0204103 A1* | 6/2020 | Tobayashi | | H02P 21/22 |
| 2020/0321888 A1* | 10/2020 | Tobayashi | | H02P 29/50 |
| 2020/0373869 A1* | 11/2020 | Mori | | H02M 7/53871 |
| 2021/0021224 A1* | 1/2021 | Niimura | | H02M 7/23 |
| 2021/0036632 A1* | 2/2021 | Hayashi | | H02M 3/157 |
| 2021/0083597 A1* | 3/2021 | Hayashi | | H02M 7/487 |
| 2022/0190741 A1* | 6/2022 | Katoh | | H02M 7/5395 |
| 2022/0306186 A1* | 9/2022 | Miki | | H02P 21/22 |
| 2022/0337173 A1* | 10/2022 | Nakamura | | H02M 1/0025 |
| 2022/0416713 A1* | 12/2022 | Kulkarni | | H02M 27/16 |
| 2023/0051706 A1* | 2/2023 | Toi | | H02M 7/539 |

OTHER PUBLICATIONS

International Search Report dated Jan. 29, 2019 in PCT/JP2018/042090 filed on Nov. 14, 2018, 2 pages.

* cited by examiner

POWER CONVERSION APPARATUS THAT DRIVES A MOTOR BY RECEIVING A THREE-PHASE AC VOLTAGE FROM AN AC POWER SYSTEM

CROSS-REFERENCE TO RELATED APPLICATION

This application is based upon and claims the benefit of priority from the prior PCT Patent Application No. PCT/JP2018/42090, filed on Nov. 14, 2018, the entire contents of which are incorporated herein by reference.

TECHNICAL FIELD

Embodiments of the present invention relate to a power conversion apparatus that drives an AC motor.

BACKGROUND ART

In a neutral point clamp (NPC) type 3-level PWM converter that receives a 3-phase AC voltage supply and outputs a 3-level DC voltage, a first capacitor is connected between a positive (P pole: hereinafter referred to as P) and a neutral point (C pole: hereinafter referred to as C), and a second capacitor is connected between the neutral point (C) and a negative electrode (N pole: hereinafter referred to as N) in a DC circuit. It is desirable that the first capacitor and the second capacitor are balanced at equal DC voltages. When AC current of the converter is small, it is difficult to keep a voltage balance between the first capacitor and the second capacitor (voltage between P-C and N-C), and when the converter is no loaded, if these DC voltages imbalance occurs, the load current does not flow from the power system, and the balance cannot be maintained automatically. Therefore, it is necessary to balance them by superimposing reactive currents. For example, a lead reactive current is always need to flow in consideration of an impedance of input transformer.

It is known to control a PWM control means in such that the difference between the voltages applied to the DC capacitors on the positive side and the negative side is set to zero so that the reactive current of the input current of the three-level converter becomes a predetermined reactive current(see Patent Document 1).

PRIOR ART DOCUMENT

Patent Document

Patent Document 1: Japanese Patent Publication No. 2013-143836

SUMMARY OF THE INVENTION

Problem to be Solved by the Invention

However, when the power conversion apparatus that drives the motor is used to control the reactive power on the converter side, it is necessary to dynamically change the output reactive power according to a fluctuation of the target reactive power. When the reactive power is small, a direction of the reactive current (lead/lag) may switch, and in order to maintain the balance of the DC voltage on the positive electrode side and the negative electrode side as described above, it is necessary to provide a dead band around zero reactive current. The dead band is a necessary zone in a predetermined range so that the direction of reactive current does not switch. However, in a fixed dead band, the power conversion apparatus continues to output a fixed reactive power even when the load current is large, which causes a decrease in a conversion efficiency of the power conversion apparatus.

The present invention has been made to solve the above-mentioned problems. It is an object of the present invention to provide a power conversion apparatus capable of supplying a required reactive power and maintaining the balance of DC voltage by dynamically changing reactive current of dead band near 0 in accordance with the active current of the converter.

Means for Solving the Problem

In order to achieve the above object, the power conversion apparatus according to claim 1 of the present invention comprises: a multi-level converter that converts three-phase AC power to DC power; an inverter of connected to the DC output of the multi-level converter and receives the supply of DC power outputted from the multi-level converter to output three-phase AC power for driving the motor; a plurality of capacitors connected to the DC output of the multi-level converter; a control unit for controlling the converter and the inverter, wherein the control unit is characterized in that comprises: a current detector that detects a three-phase alternating current supplied from the AC power system to the multi-level converter; a coordinate converter that receives a current value outputted from the current detector and outputs an active current feedback value equivalent to the active current and an reactive current feedback value equivalent to the reactive current; a reactive current setting unit that generates and outputs a first reactive current reference based on the active current feedback value; a dead band setting unit that sets a dead band based on the first reactive current reference with respect to a second reactive current reference and outputs a third reactive current reference; a first current controller that controls the reactive current feedback value to follow the third reactive current reference value and generates a first voltage command; a voltage controller that generates an effective current reference so that the voltage of the capacitor follows a DC voltage reference; a second current controller that controls the effective current feedback value to follow the effective current reference and generates a second voltage command; an inverse coordinate converter that generates a three-phase AC voltage command from the output value of the first current controller and the output value of the second current controller.

Effects of the Invention

According to the present invention, the dead band near 0 reactive current can be dynamically changed according to the active current of the multi-level converter, and the required reactive power can be supplied while maintaining the balance of the DC voltage.

EMBODIMENT TO PRACTICE THE INVENTION

Hereinafter, examples of the present invention will be described with reference to the drawings.
The present invention can be applied to the power conversion apparatus having a multi-level converter other than the 3-level converter, but a 3-level converter will be described as an example.

First Embodiment

Figure 1:
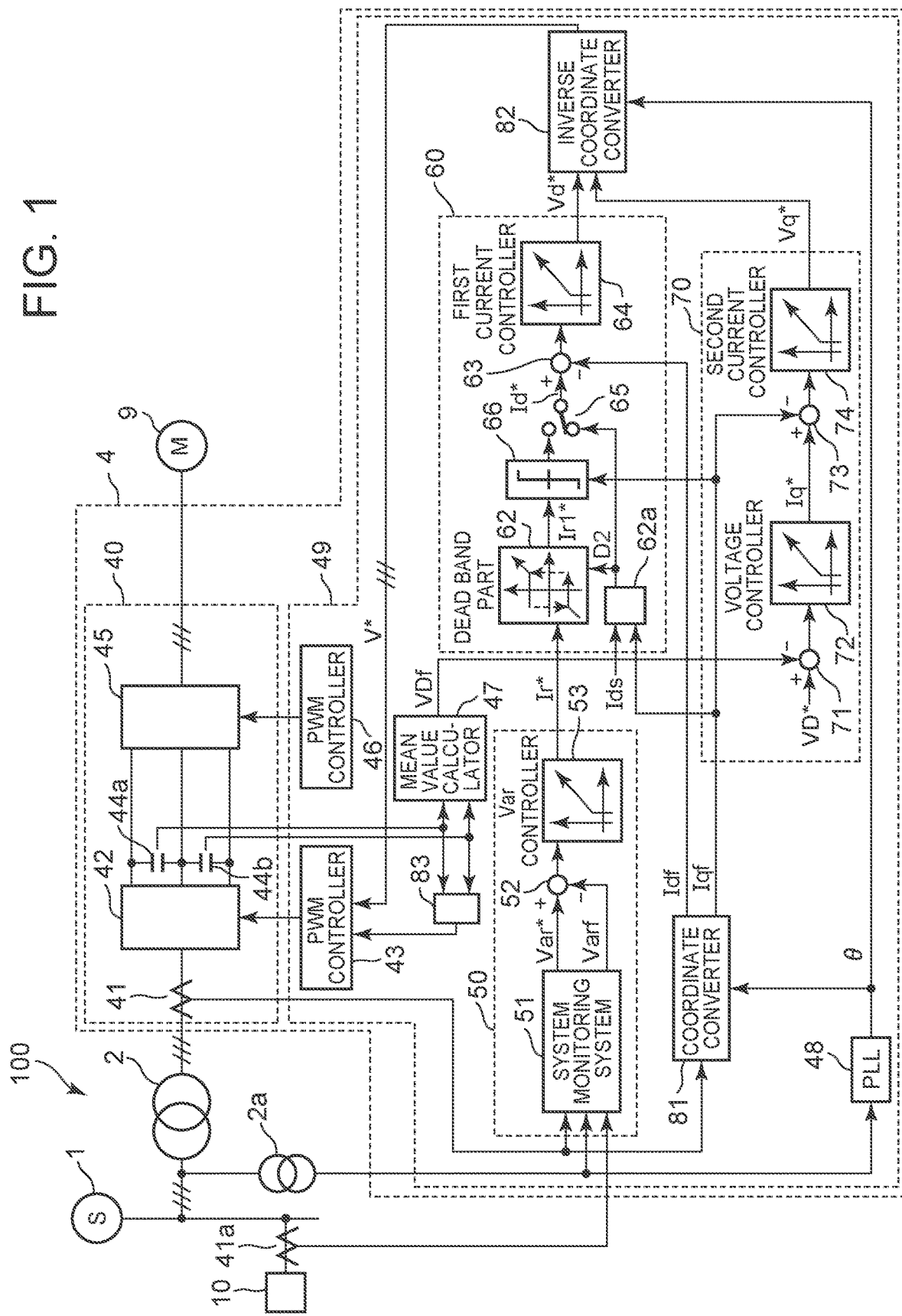
FIG. 1 is a circuit configuration diagram of a power conversion system including the power conversion apparatus capable of supplying reactive power according to a first embodiment of the present invention.

FIG. 1 is an example of a circuit configuration diagram of a power conversion system 100 provided with a power conversion apparatus 4 capable of supplying the reactive power according to the first embodiment.

Figure 2:
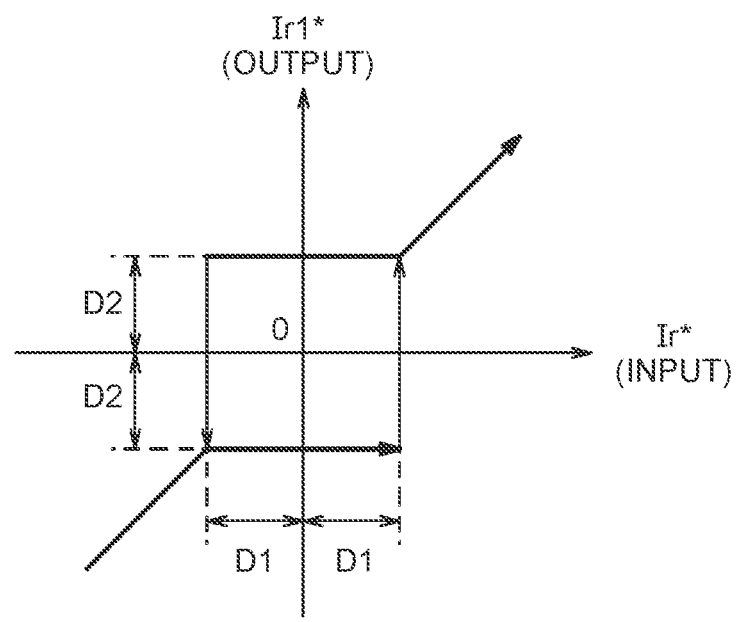
FIG. 2 is a diagram illustrating a dead band.
Figure 3:
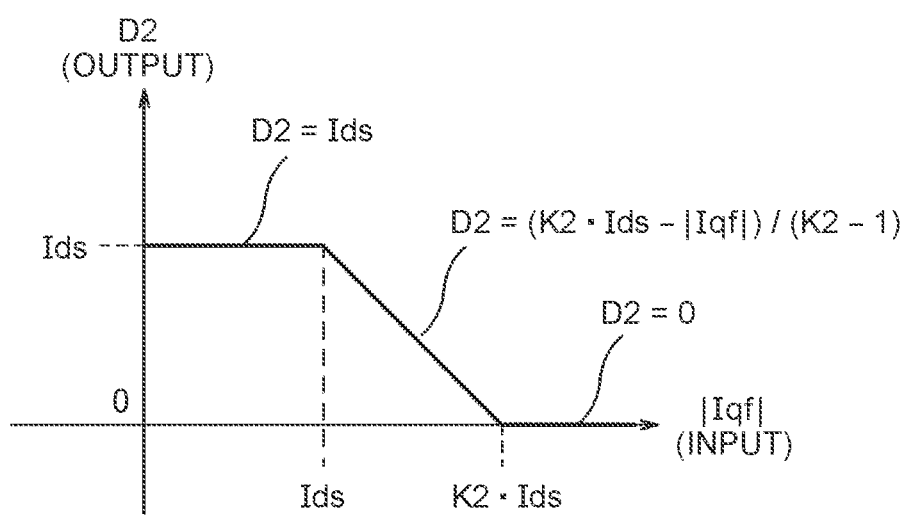
FIG. 3 is a diagram illustrating a dynamic dead band in which a dead band output value D2 is set according to an effective current (q-axis current feedback Iqf).

FIG. 2 is a diagram illustrating a dead band. FIG. 3 is a diagram illustrating a dynamic dead band in which the dead band output value D2 is set according to the effective current (q-axis current feedback Iqf).

The illustrated power conversion system 100 shows a case where the power conversion system 100 is configured to include the power conversion apparatus 4 and a motor 9 to which AC power is supplied from the power system 1 via a transformer 2.

The power conversion apparatus 4 is composed of a main circuit unit 40, a control unit 49. Further, there is a load 10 connected to the power system 1 and a current detector 41*a* for detecting a current supplied from the power system 1 to the load 10.

The power conversion apparatus 4 supplies the motor 9 with the three-phase AC power required to drive the motor 9. The main circuit unit 40 includes a current detector 41, a 3-level converter 42, smoothing capacitors 44*a*/44*b*, a 3-level inverter 45.

Three-phase AC power is inputted from the power system 1 to the main circuit unit 40 of the power conversion apparatus 4 via the transformer 2. The output of the transformer 2 is connected to the 3-level converter 42 via the current detector 41.

On the DC circuit side of the 3-level converter 42, a first capacitor 44*a* is connected between the positive electrode (P) and the neutral point (C), and a second capacitor 44*b* is connected between the neutral point (C) and the negative electrode (N). Further, a 3-level inverter 45 is connected to the positive electrode (P), the neutral point (C), and the negative electrode (N).

The 3-level converter 42 switches switching elements by gate pulses outputted from the PWM controller 43 in the control unit 49, and converts the AC power supplied via the transformer 2 into the 3-level DC power.

The PWM (Pulse Width Modulation) control unit 43 outputs gate pulses that control the gate of switching elements constituting the three-level converter 42.

The smoothing capacitor 44*a* and the smoothing capacitor 44*b* smooth the DC voltage outputted from the 3-level converter 42.

The 3-level inverter 45 receives 3-level DC power outputted from the smoothing capacitors 44*a* and 44*b*. Further, the three-level inverter 45 controls switching elements by gate pulses outputted from the PWM controller 46, and outputs a variable frequency three-phase AC voltage to the motor 9 for driving the motor 9 at a desired rotation speed. The motor 9 is connected to the three-phase AC output of the three-level inverter 45.

The voltage detector 2*a* connected to the power system 1 detects the three-phase AC voltage of the power system 1. The detected three-phase AC voltage is inputted to the system monitoring system 51 and the phase detection circuit 48 in the control unit 49 of the power conversion apparatus 4.

The current detector 41 detects the three-phase alternating current supplied to the three-level converter 42, and inputs the detected three-phase alternating current to the control unit 49.

The control unit 49 includes the PWM controllers 43 and 46, a reactive power control unit 50, a d-axis current control unit 60, a q-axis current control unit 70, a coordinate converter 81, and a reverse phase coordinate converter 82.

The phase detection circuit 48 is composed of, for example, a phase-locked loop (PLL) or the like, detects the phase θ of the power system 1, and inputs this as a reference phase to the coordinate converter 81 and the inverse coordinate converter 82.

The voltage between the terminals of the first capacitor 44*a* and the voltage between the terminals of the second capacitor 44*b* are inputted to the mean value calculator 47. The output of the mean value calculator 47 is an average voltage of the first capacitor 44*a* and the second capacitor 44*b*, and is inputted to the q-axis current control unit 70.

Further, the voltage between the terminals of the first capacitor 44*a* and the voltage between the terminals of the second capacitor 44*b* are inputted to the difference detector 83.

The difference detector 83 calculates the difference voltage ΔE between the terminals of the first capacitor 44*a* and the voltage between the terminals of the second capacitor 44*b*, and inputs the value to the PWM controller 43 as a neutral point fluctuation suppression signal.

The PWM controller 43 outputs the gate pulse of the three-level converter 42 according to the voltage reference V* of the three-phase alternating current outputted from the inverse coordinate converter 82 described later. Further, the PWM controller 43 adds a DC amount proportional to the difference voltage ΔE between the terminal voltage of the first capacitor 44*a* and the terminal voltage of the second capacitor 44*b* to the voltage reference V* so that the difference voltage ΔE decrease. Alternatively, the voltage ΔE is corrected so as to decrease by adjusting the amplitude of the modulated wave or adjusting the 0-level voltage output period of the 3-level converter.

The coordinate converter 81 receives the three-phase alternating current outputted from the current detector 41 with the phase θ of the power system detected by the phase detection circuit 48 as a reference phase, and outputs a two-axis current component composed of the d-axis current feedback Idf and the q-axis current feedback Iqf, these are orthogonal to each other.

The d-axis current feedback Idf corresponds to the reactive current, and the q-axis current feedback Iqf corresponds to the active current. If a loss of the main circuit unit 40 is ignored, the q-axis current feedback Iqf corresponds to the active current outputted by the inverter 45. That is, it corresponds to the effective current component of the load current outputted by the inverter 45. The inverse coordinate converter 82 performs the reverse conversion of the coordinate converter 81.

The reactive power control unit 50 includes a system monitoring system 51, a subtraction circuit 52, a Var controller 53.

The system monitoring system 51 monitors the voltage, active power, and reactive power supplied from the power system 1 to the load side, and here, the reactive power reference (Var reference) Var* and the reactive power feedback (Var feedback) Varf are generated and outputted. The output Var reference Var* is inputted to the +terminal of the subtraction circuit 52, and the Var feedback Varf is inputted to the −terminal of the subtraction circuit 52.

The system monitoring system 51 calculates a reactive power supplied from the power system 1 to the load 10 from the current supplied to the load 10 detected by the current detector 41a and the voltage of the power system 1 detected by the voltage detector 2a, and generates Var reference Var* based on the reactive power.

The system monitoring system 51 calculates a reactive power supplied from the three-level converter 42 to the AC side from a current supplied to the three-level converter 42 detected by the current detector 41 and the voltage of the power system 1 detected by the voltage detector 2a, and generates a Var feedback Varf based on the reactive power.

The subtraction circuit 52 inputs the difference (residual deviation) of the reactive power obtained by subtracting the Var feedback Varf from the Var reference Var* to the Var controller 53.

Based on the difference of the reactive power inputted from the subtraction circuit 52, the Var controller 53 performs, for example, proportional integration control so that the Var feedback Varf value follows the Var reference Var* value, and generates and outputs the reactive current reference Ir*. The output reactive current reference Ir* is inputted to the d-axis current control unit 60.

The d-axis current control unit 60 includes a dead band part 62, a dead band setting unit 62a, a subtraction circuit 63, a first current controller 64 (first current controller), a changeover switch 65, and controls the d-axis current (reactive current). The description of the dead band part 62 will be described with reference to FIGS. 2 and 3 as well.

In order to control the voltage balance between the smoothing capacitor 44a and the smoothing capacitor 44b by the three-level converter 42, it is necessary to transfer the electric charge between the smoothing capacitor 44a and the smoothing capacitor 44b. That means, it is necessary that a predetermined current is flowing through the 3-level converter. The dead band part 62 controls the three-level converter 42 to flow a predetermined reactive current even when the motor 9 is lightly loaded or stopped or the load 10 is not consuming reactive power.

The dead band shown in FIG. 2 is, for example, when the reactive power is dynamically changed according to the reactive power of the load 10, and when the reactive current becomes close to 0, the direction (advance/delay) of the reactive current may be switched, and, in order to maintain the balance of the DC voltage, a dead band is provided near the reactive current 0 so that the direction of the reactive current does not switch within the predetermined dead band width value (=|D1|).

The reactive current reference Ir* outputted from the Var controller 53 is inputted to the dead band part 62. The output Ir1* of the dead band part 62 is connected to the first input of the changeover switch 65 via the limiter 66.

The q-axis current feedback Iqf is inputted as a control signal of the limiter 66, and if the sum of the square of the input value of the limiter 66 and the square of the q-axis current feedback Iqf is not exceeded the square of a current limit value Imc of the 3-level converter 42, the limiter 66 outputs the input value as it is. If the sum of the square of the input value of the limiter 66 and the square of the q-axis current feedback Iqf is exceeded the current limit value Imc, the polarity of the output Ir2* of the limiter 66 is the same as that of the input signal, and its absolute value is expressed by the following equation (1). The current limit value Imc is, for example, the continuous maximum alternating current value of the 3-level converter 42.

$$|Ir2^*|=\sqrt{Imc^2-Iqf^2} \quad (1)$$

The d-axis current reference set value Ids outputted from a d-axis current reference setting unit (not shown) and the q-axis current feedback Iqf outputted from the coordinate converter 81 are inputted to the dead band setting unit 62a, and a dead band output value D2 is outputted.

The dead band output value D2 is inputted to the dead band part 62 to set the dead band and is connected to a second input of the changeover switch 65.

The output Id* of the changeover switch 65 is connected to the adder input of the subtractor 63. The d-axis current feedback Idf, which is the output of the coordinate converter 81, is inputted to the subtraction input of the subtractor 63. The output of the subtractor 63 is inputted to the first current controller 64. As will be described later, with this configuration, the d-axis current feedback Idf of the 3-level converter 42, that is, the reactive current output by the 3-level converter 42 is controlled so as to follow the output Id* of the changeover switch 65.

The relationship between the input and the output of the dead band part 62 will be described with reference to FIG. 2.

(1) when the absolute value of input reactive current reference Ir* exceeds the dead bandwidth value (=|D1|), the output Ir1* is proportional to the input. Here, assuming that the gain of the output with respect to the input is K, the output Ir1* is calculated by the following equation (2).

$$Ir1^*=K\cdot Ir^*$$

$$D2=K\cdot D1$$

$$D1=D2/K \quad (2)$$

(2) When the input changes from a large value to a small value: In the range of 0≤input≤|D1|, output=D2.
(3) When the input changes from a small value to a large value: In the range of 0≥input≥−|D1|, output=−D2.

That is, the relationship between the output and the input is such that when the input (q-axis current feedback value) is near 0 (range of 0≤input≤|D1|), the output (d-axis current reference value) has a hysteresis characteristic.

In the above description, the case of D1≠D2 is shown, but it is natural that K=1 and D1=D2 may be set. The upper limit of the dead band output value D2 in this embodiment is specified by the d-axis current reference set value Ids, and is used, for example, in the range of 10% of the rated current of the converter 42.

The dead band output value D2 is set as follows by the dead band setting part 62a with input values of the d-axis current reference set value Ids and the q-axis current feedback Iqf.

FIG. 3 is a diagram illustrating a dynamic dead band of the d-axis current reference Ids according to the load of the motor 9. Hereinafter, the method of setting the dead band output value D2 shown in FIG. 3 is shown in the following equations (3) to (5).

(1) In $0 \leq |Igf| \leq Ids$, $$D2 = Ids \quad (3)$$

(2) In $Ids \leq |Iqf| \leq K2 \cdot Ids$, $$D2 = (K2 \cdot Ids - Iqf)/(K2-1) \quad (4)$$

(3) In $K2 \cdot Ids \leq |Iqf|$ $$D2 = 0 \quad (5)$$

Ids: A positive set value in the d-axis current reference setting unit.
K2: A proportionality constant of 1 or more, can be set to 2, for example.

The portion shown in the above equation (3) corresponds to a dead band that does not depend on the load of the motor 9, and the portion shown in the above equation (4) corresponds to a dynamic dead band.

In the range where the absolute value of the q-axis current feedback Iqf, which is almost proportional to the load of the electric motor 9, is smaller than a predetermined value (=Ids), and the dead band output value D2 is fixed to a constant value (=Ids), the reactive current of the converter 42 is maintained. When the absolute value of the q-axis current feedback Iqf does not exceed K2 times the predetermined value, the dead band output value D2 is changed to reduce as the absolute value of the q-axis current feedback Iqf increases, and the absolute value of the q-axis current feedback Iqf is set to 0 or a minute value when the absolute value becomes predetermined value K2 or more. This is because if the load of the motor 9 (q-axis current feedback Iqf) rises and the load current flows, the DC voltage naturally becomes easy to balance, so it is not necessary to flow a reactive current at the time of loading. Therefore, by seamlessly adjusting the dead band according to the load, the output of unnecessary reactive power can be reduced, and the efficiency of the power conversion apparatus 4 is improved.

By switching the signal output by the selector switch 65 from the first input or the second input by the control signal of the changeover switch 65 (not shown), operation in which the power conversion apparatus 4 is compensated for the reactive power of the load 10(reactive power control operation) and operation without the reactive power compensation of the load 10 (non-reactive power control operation) is able to be selected.

(1) Reactive Power Control Operation
In the reactive power control operation, the changeover switch 65 selects the first input as an output. Therefore, the changeover switch 65 outputs the output Ir2* of the limiter 66 as the reactive current reference Id*.

(2) Non-Reactive Power Control Operation
In non-reactive power control operation, the changeover switch 65 selects the second input as the output. Therefore, the changeover switch 65 outputs the output D2 from the dead band setting unit 62a as the reactive current reference Id*.

The subtraction circuit 63 outputs the difference (residual deviation) obtained by subtracting the invalid current reference Id* and the d-axis current feedback Idf outputted from the coordinate converter 81. The difference of the output d-axis current is inputted to the first current controller 64.

The first current controller 64 generates and outputs the d-axis voltage reference Vd* so that the d-axis current feedback Idf value follows the output Id* value of the changeover switch 65 based on the difference of the d-axis current inputted from the subtraction circuit 63. The first current controller 64 is, for example, a proportional plus integral controller.

The output d-axis voltage reference Vd* is inputted to the coordinate converter 82.

The q-axis current control unit 70 includes a subtraction circuit 71, a voltage controller 72, a subtraction circuit 73, a second current controller 74.

The subtraction circuit 71 inputs a DC voltage difference (residual deviation) to the voltage controller 72. The DC voltage difference (residual deviation) is obtained by subtracting the DC voltage feedback VDf outputted from the mean value calculator 47 from the DC voltage reference VD* set by the DC voltage reference setting circuit (not shown).

The voltage controller 72 generates and outputs a q-axis current reference Iq* so that the DC voltage feedback VDf follows the DC voltage reference VD* value based on the difference in the DC voltage inputted from the subtraction circuit 71. The voltage controller 72 is, for example, a proportional plus integral controller.

The q-axis current reference Iq* outputted from the voltage controller 72 is inputted to the plus terminal of the subtraction circuit 73.

The subtraction circuit 73 outputs the difference (residual deviation) obtained by subtracting the q-axis current feedback Iqf outputted from the coordinate converter 81, from the q-axis current reference Iq*. The difference of the output q-axis current is inputted to the second current controller 74.

The second current controller 74 generates and outputs a q-axis voltage reference Vq* so that the q-axis current feedback Iqf follows the q-axis current reference Iq* value based on the difference of the q-axis current inputted from the subtraction circuit 73.

The second current controller 74 is, for example, a proportional plus integral controller.

The q-axis voltage reference Vq* outputted from the second current controller 74 is inputted to the inverse coordinate converter 82. The inverse coordinate converter 82 generates and outputs a voltage reference V* (three-phase AC voltage reference) by inverse coordinate conversion of two-axis signals into a three-phase signal with reference to e, that is a phase output of the phase detection circuit 48. The two-axis signals are the d-axis voltage reference Vd* inputted from the first current controller 64 and the q-axis voltage reference Vq* inputted from the second current controller 74. The output voltage reference V* is inputted to the PWM controller 43.

The 3-level converter 42 is an example of a multi-level converter. The q-axis current feedback Iqf, which is the output of the coordinate converter 81, is an example of the effective current feedback value. The d-axis current feedback Idf, which is the output of the coordinate converter 81, is an example of the reactive current feedback value. The dead band setting unit 62a is an example of the reactive current setting unit. The dead band output value D2, which is the output of the dead band setting unit 62a, is an example of the first reactive current reference. The reactive current reference Ir*, which is the output of the reactive power control unit 50, is an example of the second reactive current reference. The output Ir1* of the dead band part 62 is an example of the third reactive current reference. The d-axis voltage reference Vd*, which is the output of the first current controller, is an example of the first voltage command. The DC voltage feedback VDf, which is the output of the mean value calculator 47, is an example of the voltage of the capacitor. The voltage reference V*, which is the output of the inverse coordinate converter 82, is an example of a three-phase alternating current voltage command. The d-axis current reference set value Ids outputted from the d-axis current reference setting unit is an example of the fourth reactive current reference. The d-axis current reference set value Ids is an example of the first value. K2·Ids, which is the product of the proportionality constant K2 and the d-axis current reference set value Ids, is an example of the second value. The continuous maximum AC current value of the 3-level converter 42 is an example of the current limit value.

As described above, according to the embodiment of the present invention, when the load of the motor 9 is large and the reactive current of the converter 42 may be small, the reactive current of the converter 42 in dead bandwidth can be reduced.

Therefore, according to the present invention, a power conversion apparatus having good efficiency can be provided by changing the dead band near 0 d-axis current (reactive current) dynamically according to the load of the motor 9. The power conversion apparatus can supply the required reactive power while maintaining the balance of the DC voltage.

While certain embodiment have been described, the embodiment has been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

EXPLANATION OF SYMBOLS

1 Power system
2 Transformer
2a Voltage detector
4 Power conversion apparatus
10 Load
40 Main circuit unit
41, 41a Current detector
42 3-level converter
43 PWM controller
44a, 44b Smoothing capacitor
45 Inverter
46 PWM controller
47 Mean value calculator
48 Phase detection circuit
50 Reactive power control unit
51 System monitoring system
52,63,71,73 Subtraction circuit
53 Var controller
60 d-axis current control unit
62 Dead band part
62a, Dead band setting unit
64 First current controller
66 Limiter
72 Voltage controller
74 Second current controller
70 q-axis current control unit
81 Coordinate converter
82 Inverse coordinate converter
83 Difference detector
9 Motor

The invention claimed is:

1. A power conversion apparatus that drives a motor by receiving a three-phase AC voltage from an AC power system, comprising:
a multi-level converter that converts three-phase AC power to DC power;
an inverter connected to a DC output of the multi-level converter and receives the DC power outputted from the multi-level converter to output three-phase AC power for driving the motor;
a plurality of capacitors connected to the DC output of the multi-level converter; and
a control unit for controlling the multi-level converter and the inverter, wherein the control unit comprises:
a current detector that detects a three-phase alternating current supplied from the AC power system to the multi-level converter;
a coordinate converter that receives a current value outputted from the current detector and outputs an active current feedback value equivalent to an active current and a reactive current feedback value equivalent to a reactive current;
a reactive current setting unit that generates and outputs a first reactive current reference based on the active current feedback value;
a dead band setting unit that sets a dead band based on the first reactive current reference with respect to a second reactive current reference and outputs a third reactive current reference;
a first current controller that controls the reactive current feedback value to follow the third reactive current reference and generates a first voltage command;
a voltage controller that generates an effective current reference so that a voltage of the plurality of capacitors follows a DC voltage reference;
a second current controller that controls the active current feedback value to follow the effective current reference and generates a second voltage command; and
an inverse coordinate converter that generates a three-phase AC voltage command from an output value of the first current controller and an output value of the second current controller.

2. The power conversion apparatus according to claim 1, wherein a dead band part of the dead band setting unit has a hysteresis converter.

3. The power conversion apparatus according to claim 1, wherein the second reactive current reference is generated based on a reactive power of loads connected to the AC power system.

4. The power conversion apparatus according to claim 3, wherein the second reactive current reference is generated from the difference between the reactive power of the loads connected to the AC power system and a reactive power outputted by the multi-level converter.

5. The power conversion apparatus according to claim 1, wherein the second reactive current reference is generated from the difference between a reactive power of a load connected to the AC power system and a reactive power outputted by the multi-level converter.

6. The power conversion apparatus according to claim 1, wherein the reactive current setting unit outputs a fourth reactive current reference as the first reactive current reference when an absolute value of the active current feedback value is smaller than a first value, outputs a value as the first reactive current reference that decrease from the fourth reactive current reference to 0 when the absolute value of the active current feedback value changes from the first value to a second value, and outputs 0 as the first reactive current reference when the absolute value of the active current feedback value is equal to or higher than the second value.

7. The power conversion apparatus according to claim 6, wherein the control unit further comprises a changeover switch capable of selecting either an output of a limiter or an output of the reactive current setting unit, and uses an output of the changeover switch as the third reactive current reference.

8. The power conversion apparatus according to claim 1, wherein the control unit has a limiter at an output of the dead band setting unit so that a sum of a square of an output value of the limiter and a square of the reactive current feedback value does not exceed a sum of the squares of a current limit value of the multi-level converter, and an output value of the limiter is used as the third reactive current reference.

9. The power conversion apparatus according to claim 1, wherein the multi-level converter is a three-level converter.

* * * * *